United States Patent [19]

McMillan et al.

[11] 4,062,982

[45] Dec. 13, 1977

[54] METHOD FOR STERILIZATION OF FOOD PRODUCTS

[75] Inventors: Kenneth R. McMillan; Gary A. Henderson, both of Cobourg, Canada

[73] Assignee: General Foods, Limited, Toronto, Canada

[21] Appl. No.: 691,126

[22] Filed: May 28, 1976

[30] Foreign Application Priority Data

May 28, 1975 Canada .................................. 227913

[51] Int. Cl.² .......................... A23L 3/34; A21D 2/14
[52] U.S. Cl. ....................................... 426/320; 21/58; 21/DIG. 4; 426/335
[58] Field of Search ............ 21/DIG. 4, 58; 426/320, 426/335

[56] References Cited

U.S. PATENT DOCUMENTS

| | | | |
|---|---|---|---|
| 3,069,734 | 12/1962 | Leuthner | 21/DIG. 4 |
| 3,088,179 | 5/1963 | Leuthner | 21/DIG. 4 |
| 3,341,280 | 9/1967 | Eolkin | 21/DIG. 4 |
| 3,341,335 | 9/1967 | Eolkin et al. | 426/320 |
| 3,477,807 | 11/1969 | Ernst | 21/DIG. 4 |
| 3,600,127 | 8/1971 | Kereluk et al. | 426/320 X |
| 3,647,487 | 3/1972 | Sair | 21/DIG. 4 |
| 3,767,362 | 10/1973 | Griffin et al. | 21/DIG. 4 |
| 3,897,210 | 7/1975 | Gruber et al. | 21/DIG. 4 |
| 3,939,287 | 2/1976 | Orwig et al. | 21/DIG. 4 |

FOREIGN PATENT DOCUMENTS 1,147,640 4/1969 United Kingdom ............ 21/DIG. 4

*Primary Examiner*—Barry S. Richman
*Attorney, Agent, or Firm*—Bruno P. Struzzi; Thomas V. Sullivan; Mitchell D. Bittman

[57] ABSTRACT

A method for sterilization of food products which maximizes microbial kill while minimizing residue formation comprising subjecting the food product to a free-flowing system containing a sterilant gas at a concentration and for a period of time effective to obtain desired level of microbial kill while avoiding formation of a substantial level of residues.

7 Claims, No Drawings

METHOD FOR STERILIZATION OF FOOD PRODUCTS

The prior art has long sought a means of sterilizing heat sensitive dry food products which would effectively decontaminate the food products without substantial residue formation.

Sterilant gases such as ethylene oxide and propylene oxide have been used in the past but their use has been severely limited due to substantial harmful residue formation (i.e., chlorohydrins) in the food products. Presently because of this residue formation various Government regulations such as those in the United States regarding food product sterilization permit use of ethylene oxide solely for unground spices, black walnut meats and copra and the use of propylene oxide for treating cocoa, glace fruits, gums, processed nut meats, dried prunes, processed spices and starches. U.S. Pat. Nos. 3,088,179 by Leuthner, 3,206,275 by Sair, 3,341,280 by Eolkin, and 3,477,807 by Ernst have disclosed sterilant gas conditions for increasing microbial kill, however, they have not seemed to have dealt with the critical problem of reducing residue formation. While U.S. Pat. No. 3,341,280 by Eolkin contemplated decreasing processing time necessary for sufficient microbial kill it has apparently not contemplated shorter periods of time or lower gas concentrations that are necessary to reduce residue formation. Neither does it deal with the conditions necessary for reduction of residue formation while at the same time obtaining a high degree of microbial kill. Some other prior art sterilization processes, as in U.S. Pat. No. 3,068,064 by McDonald, involve exposure of large bulk loads of products in drum or bags to sterilant gases for periods of time ranging from 3 to 24 hours. But due to substantial amounts of harmful residue formation these processes are restricted for use in a limited number of products.

It is theorized that the inability of a sterilant gas to completely destroy bacteria, yeasts, fungi and other organisms in food products is due to its reaction with food products, thereby reducing its availability for the organisms. Ethylene oxide and propylene oxide kill by alkylation of sulfhydryl, hydroxyl, carboxyl and amino groups of organisms but will also react with similar groups in food products. Reaction of these groups within food products with these gases would make these gases unavailable for reaction with the organisms. In this way the food product provides a protective barrier for the organisms against the sterilant gas.

Diffusion of sterilant gases through packed products is also limited. Very high gas concentrations are employed, but even then uneven kill occurs depending upon various factors, e.g., stratification of gas, entrapped air or water vapor, packaging conditions, etc. A combination of diffusion restrictions, unfavorable conditions (i.e., low temperature) and possibly chemical inactivation is responsible for the long exposure periods necessary in prior art to effect sterilization.

According to the art, gas concentration and duration of exposure of the food product to the sterilant gas are the two significant process variables contributing to bacterial death and were increased in the past to maximize the level of kill in the product. However, these variables are also significant in their effect on residue formation.

Prior art in killing bacteria and other organisms in food products with sterilant gas does not seem to have come up with a means whereby the bacterial death (and death of other organisms) would be maximized while gas concentration and duration of exposure are minimized thereby minimizing residue formation.

Briefly stated this invention involves subjecting a food product to a free-flowing system containing a sterilant gas at a concentration and for a period of time effective to obtain a desired level of microbial kill while avoiding formation of substantial levels of residues. The free-flowing system includes such methods as tumbling, atomizing, fluidizing or spraying the food product. The conditions of the system needed to maximize microbial kill while minimizing residue formation are subjecting the food product to sterilant gas for a period of time less than about 15 minutes, employing high temperatures, and low sterilant gas concentrations. The preferred food product treated according to the process of this invention is generally in the form of a powder and has a low chloride content.

For maximum rapid microbial kill several important factors are: (1) maximum sterilant gas-food particle contact, (2) high moisture, and (3) high temperature. When the instant invention is applied, the remaining variables (e.g., gas concentration and exposure time) do not exert a significant effect so they can be decreased substantially from prior art practice without adversely effecting the microbial kill.

On the other hand the important factors in limiting residue formation in the food product are (1) short exposure time, (2) low gas concentration, (3) low moisture, and (4) low chloride content in the food product.

By combining the important factors we have unexpectedly discovered the present process for maximum microbial kill and for limiting residue formation in food products.

One critical condition is rapidly maximizing the sterilant gas food particle contact which can be carried out by a number of means which include tumbling, spraying, atomizing or fluidizing the food particles in a sterilant gaseous system. By providing this free-flowing system rapid and intimate contact between the microbial cells and the sterilant gas is achieved resulting in a rapid increased level of microbial kill. Table I indicates the effect of tumbling in increasing microbial kill versus a static condition. Thus a much shorter time period is necessary than used in prior art to effect a desired level of microbial kill.

The next condition which must be minimized to prevent residue formation is exposure time. Using the present invention an effective level of microbial kill can be accomplished generally in not greater than about 15 minutes and in some instances less than 5 minutes. Table II indicates the rapid microbial kill accomplished with the process of this invention alleviating the prior art necessity of long exposure periods which was generally at least three hours for a similar level of microbial kill. The data in Table II on gum arabic being read in conjunction with Table III which indicates what effect an increase in moisture content would have upon the percent survival. As the formation of residue is dependent upon exposure time this invention by significantly reducing the exposure time thereby decreases the residue formation while still obtaining a desired level of microbial kill.

Another critical condition which is preferably controlled to minimize residue formation is sterilant gas concentration. Through use of this free-flowing system it is no longer a necessity to have high concentrations of sterilant gas (i.e., ethylene oxide, propylene oxide or combinations thereof) to enable the gas to penetrate through the bulk of the product to sterilize it. Now sterilant gas concentrations of ethylene oxide and/or propylene oxide from about 200 mg/liter to about 800 mg/liter can be used without a significant difference in microbial kill throughout the range and since minimum residue formation requires the lowest sterilant gas concentration possible, 200 mg/liter will be the most preferred gas concentration.

The next critical condition, high temperature, results in an increase in microbial kill while having no significant effect on residue formation. The temperature range of about 35° to 55° C when used in combination with the sterilant gas has been found to be effective with 55° C providing the greatest level of microbial kill. Higher temperatures may be employed. However, the detrimental effects of high temperatures on certain food products must be taken into consideration and the temperatures employed must be adjusted accordingly.

The final critical condition is moisture content which must be balanced according to the level of microbial kill desired and the level of residues desired. Generally, optimum conditions for microbial kill exist with a moisture content in the range of about 8% to 12%, while optimum moisture conditions for limiting residue formation, depending on the product, is either as low a moisture content as possible or where the moisture content exerts no significant effect on the residue formation.

As shown in Table IV for wheat flour an increase in moisture content will result in a substantial increase in chlorohydrin formation under conditions of prior art known to effect microbial kill, while Table III indicates that for gum arabic under conditions of the present invention with an increase in moisture content there is no increase in the chlorohydrin level. However, for both wheat flour and gum arabic an increase in moisture content will result in an increase in microbial kill. Therefore, the moisture content to be employed must be controlled for each product, taking into consideration the residue formation and microbial kill level of that product at various moisture contents under conditions of the process to be employed.

Another condition which is preferably controlled is the chloride content in the product. Its reduction, if possible, reduces residue (chlorohydrin) formation while not affecting the microbial kill. Also, preferably the product is in the form of a powder thus maximizing sterilant gas-food particle contact.

EXAMPLE I

100 Grams wheat flour (12% moisture) contaminated with spores of B. subtilis var niger at a level of 32 million organisms per gram are placed in a rotary chamber and heated to 55° C. The chamber is sealed and the air is evacuated to 30 inches of mercury. The chamber is then pressurized with a mixture of 12% ethylene oxide/Freon 12* to give a concentration of 200 milligrams ethylene oxide per liter of space and rotated at 50 rpm for 15 minutes. The chamber is then evacuated to 30 inches of mercury, flushed with air and opened. The level of bacteria in the sample after treatment is found to be less than 100 per gram. Ethylene chlorohydrin residue in the sample was approximately 100 ppm.
*Trade mark

EXAMPLE II

1000 Grams gelatin (10.5% moisture) was contaminated with spores of B. subtilis var niger at a level of 1,000,000 organisms per gram. The sample was placed in a rotary chamber and heated to 55° C. The chamber was closed and evacuated to 30 inches of mercury, then pressurized with a mixture of 12% ethylene oxide/Freon 12* to give a concentration of 200 mg/liter ethylene oxide and then the chamber was rotated at 50 rpm for 15 minutes. The chamber was then evacuated to 30 inches of mercury, flushed with air and opened. The level of bacteria in the sample was less than 100 per gram. Ethylene chlorohydrin levels in the gelatin sample were less than 30 ppm.
*Trade mark

EXAMPLE III

Three 1-kilogram samples of gum arabic of differing moisture levels were inoculated with spores of B. subtilis var niger at levels of 10 - 300 million organisms per gram of sample and each of the samples were placed in a rotary chamber which was closed and evacuated. Following exposure of the inoculated gum arabic samples to 200 milligrams of ethylene oxide per liter at 55° C and rotation of the closed chamber at 50 rpm for 15 minutes, duplicate samples were analyzed for standard bacterial plate count and ethylene chlorohydrin level. The results are summarized in Table III.

Table I

Bacterial Counts in Wheat Flour Treated with Ethylene Oxide: Static vs. Tumbling Process

| Time Hr. | Temperature °C | Gas Concentration mg/liter | Process | Bacteria per gram Before | After | % Survival |
|---|---|---|---|---|---|---|
| 6 | 28 | 1000 | Static | $5.0 \times 10^4$ | $<100^{(1)}$ | $<.2$ |
| 2½ | 27 | 900 | Static | $1.3 \times 10^4$ | $2.0 \times 10^{3(2)}$ | 15.4 |
| 1½ | 40 | 200 | Static | $2.2 \times 10^7$ | $2.8 \times 10^4$ | .12 |
| 0.25 | 50 | 200 | Tumbled | $8.4 \times 10^7$ | $<100$ | $<.0001$ |
|  |  |  |  | E. coli per gram Before | After |  |
| 0.25 | 45 | 460 | Static | $8.7 \times 10^5$ | $3.6 \times 10^3$ | .414 |
| 0.25 | 45 | 460 | Tumbled | $8.7 \times 10^5$ | $<10$ | $<.001$ |

[1]Vojnich, C. and V.E. Pfeifer (1967). Cereal Science Today, Vol. 12(2) 54
[2]Hall, L. (1938). Food Industries. Aug. 1968

Table II

Bacterial Counts and Chlorohydrin Levels in
Products Following Tumbling in the Presence
of Sterilizing Gases for 15 Minutes

| | Gas | Concentration | Temp. °C | Moisture % | Time Hr. | Bacteria per gram Before | Bacteria per gram After | % Survival | Chlorohydrin ppm |
|---|---|---|---|---|---|---|---|---|---|
| Wheat Flour | Ethylene Oxide | 200 mg/Liter | 55 | 12.1 | 0.25 | $3.2 \times 10^7$ | $2.7 \times 10^1$ | .0001 | 108 |
| Wheat Flour | Propylene Oxide | 200 mg/Liter | 55 | 12.1 | 0.25 | $3.1 \times 10^7$ | $4.7 \times 10^2$ | .0015 | 150 |
| Gelatin | Ethylene Oxide | 200 mg/Liter | 55 | 10.6 | 0.25 | $1.0 \times 10^6$ | $3.0 \times 10^1$ | .003 | <30 |
| Gelatin | Propylene Oxide | 200 mg/Liter | 38 | 10.6 | 0.25 | $1.2 \times 10^5$ | $1.3 \times 10^2$ | .108 | <30 |
| Gum Arabic | Ethylene Oxide | 200 mg/Liter | 55 | 5.3 | 0.25 | $5.2 \times 10^4$ | $1.8 \times 10^4$ | 34.6 | <30 |
| Gum Arabic | Propylene oxide | 800 mg/Liter | 55 | 5.3 | 0.25 | $3.2 \times 10^5$ | $2.0 \times 10^5$ | 62.5 | <30 |

Table III

Effect of Product Moisture Content on B. subtilis
and Chlorohydrin Levels in Gum Arabic Following
Treatment with 200 mg/liter Ethylene Oxide for
15 Minutes at 55° C

| Moisture % | Viable Bacteria/Gram Before | Viable Bacteria/Gram After | % Survival | Ethylene Chlorohydrin ppm |
|---|---|---|---|---|
| 5.4 | $4.0 \times 10^7$ | $1.7 \times 10^7$ | 42.5 | <30 |
| 8.6 | $1.1 \times 10^7$ | $8.2 \times 10^4$ | 0.745 | <30 |
| 10.4 | $3.2 \times 10^8$ | $3.3 \times 10^2$ | 0.0001 | <30 |

Table IV

Effect of Moisture Content on Chlorohydrin Levels
in Wheat Flour Exposed to 800 mg/liter Propylene
Oxide for 4 hours

| Moisture % | Propylene Chlorohydrin ppm |
|---|---|
| 0.4 | <30 |
| 3.8 | 94 |
| 9.4 | 496 |

The embodiments of the invention in which an exclusive property or privilege is claimed are defined as follows:

1. A method for sterilization of food products which comprises subjecting a food product to a free flowing system in a closed chamber containing a sterilant gas selected from the group consisting of ethylene oxide and propylene oxide and mixtures thereof at a concentration and at a temperature and for a period of time not greater than about 15 minutes effective to obtain a desired level of microbial kill while minimizing formation of chlorohydrins.

2. The method of claim 1 wherein the concentration of said sterilant gas is in the range of about 200 mg/liter to 800 mg/liter.

3. The method of claim 1 wherein the temperature in said chamber is from about 35° C to about 55° C.

4. The method of claim 1 wherein the food product is subjected to said free flowing system in said chamber by tumbling said food product.

5. The method of claim 1 further comprising controlling the moisture content of said food product according to the level of microbial kill desired and the level of residues desired.

6. The method of claim 1 further comprising minimizing the chloride level of said food product prior to subjecting said food product to said sterilant gas.

7. The method of claim 1 wherein said food product is a powder.